UNITED STATES PATENT OFFICE.

DAVID BEATTY AND SAMUEL C. IRVING, OF BERKELEY, CALIFORNIA.

FELT-LIKE SUBSTANCE.

No. 883,442.  Specification of Letters Patent.  Patented March 31, 1908.

Application filed February 19, 1906. Serial No. 301,810.

*To all whom it may concern:*

Be it known that we, DAVID BEATTY and SAMUEL C. IRVING, citizens of the United States, residing at Berkeley, in the county of Alameda and State of California, have invented certain new and useful Improvements in Felt-Like Substances, of which the following is a specification.

The object of the present invention is to make a felt-like roofing, sheeting, or the like, which shall be flexible, durable, cheap, and water-proof.

Our improved felt-like substance is formed as follows: We make a magnesian cellulose by immersing cotton in a strong solution of sodium hydrate in which oxid of magnesium in excess has been mixed; it is then allowed to stand for three days. After that the mixture is treated with bisulfid of carbon in weight about equal to the amount of cellulose used. This is allowed to stand for some hours. The carbon bisulfid is used to make the soda cellulose soluble in water. The carbon bisulfid in combining with the soda cellulose forms a sulfocarbonate of cellulose together with sodium carbonate and thiocarbonic acid. With this substance, which is in a pasty form, we mix magnesium chlorid in quantity greater than is necessary to form sodium chlorid with the soda therein. The excess of magnesium chlorid forms, with the oxid of magnesium originally mixed with the sodium hydrate, di-magnesic oxy-dichlorid, and magnesium viscose and some soluble salts, which are afterwards removed, while the carbon dioxid combined with the sodium, and the thiocarbonic acid appear to decompose the carbon bisulfid. After this we add as much resin varnish as is needed, about 25% to 50% of the cellulose, dissolved in gasolene, and incorporate it with the other ingredients. The varnish is used to render it more water-proof, and prevent too rapid decomposition. As compared with turpentine, used for a similar purpose, it is very much cheaper, and a less quantity is required. The turpentine is too volatile, and, on evaporating, leaves scarcely a trace of resinous matter. The resin renders the resulting product more solid, durable, and tenacious. Instead of resin, one can here use other resinous, oily, greasy, or gummy substances, such as gutta percha, asphaltum, castor oil, rape oil, stearic acid, etc. The product is then pressed into the form of sheets and allowed to partly dry, and, when in sheet form, is washed in dilute acid and then in pure water.

We claim:—

1. A roofing felt containing magnesian cellulose and a resin, substantially as described.

2. The process of making a felt roofing which consists in treating a magnesian cellulose with bisulfid of carbon and magnesium chlorid, afterwards incorporating a solution of a resin, and then forming the resulting product into sheets, substantially as described.

In witness whereof we have hereunto set our hands in the presence of two subscribing witnesses.

DAVID BEATTY.
S. C. IRVING.

Witnesses:
 ANNIE PETERSON,
 BESSIE GORFINKEL.